(12) United States Patent
Belov et al.

(10) Patent No.: US 12,252,628 B2
(45) Date of Patent: *Mar. 18, 2025

(54) CHROMATE-FREE INORGANIC COATING SYSTEMS FOR HOT CORROSION PROTECTION OF SUPERALLOY SUBSTRATE

(71) Applicants: Irina Belov, Zionsville, IN (US); Zhihong Tang, Carmel, IN (US); Mark W. Perpall, Indianapolis, IN (US); Daryl G. Copeland, Greenwood, IN (US); Brian D. Fitzwater, Indianapolis, IN (US)

(72) Inventors: Irina Belov, Zionsville, IN (US); Zhihong Tang, Carmel, IN (US); Mark W. Perpall, Indianapolis, IN (US); Daryl G. Copeland, Greenwood, IN (US); Brian D. Fitzwater, Indianapolis, IN (US)

(73) Assignee: Praxair S.T. Technology, Inc., North Haven, CT (US)

( * ) Notice: Subject to any disclaimer, the term of this patent is extended or adjusted under 35 U.S.C. 154(b) by 739 days.

This patent is subject to a terminal disclaimer.

(21) Appl. No.: 17/517,930

(22) Filed: Nov. 3, 2021

(65) Prior Publication Data

US 2023/0340276 A1    Oct. 26, 2023

Related U.S. Application Data

(60) Provisional application No. 63/110,590, filed on Nov. 6, 2020.

(51) Int. Cl.
| | | |
|---|---|---|
| *C09D 1/00* | (2006.01) | |
| *C09D 5/00* | (2006.01) | |
| *C09D 5/08* | (2006.01) | |
| *C09D 5/10* | (2006.01) | |
| *C09D 7/40* | (2018.01) | |

(52) U.S. Cl.
CPC ............. *C09D 5/084* (2013.01); *C09D 1/00* (2013.01); *C09D 5/002* (2013.01); *C09D 5/103* (2013.01); *C09D 7/69* (2018.01)

(58) Field of Classification Search
None
See application file for complete search history.

(56) References Cited

U.S. PATENT DOCUMENTS

| | | |
|---|---|---|
| 3,248,251 A | 4/1966 | Allen |
| 4,537,632 A | 8/1985 | Mosser |
| 4,544,408 A | 10/1985 | Mosser |
| 4,606,967 A | 8/1986 | Mosser |
| 4,659,547 A | 4/1987 | Svenson et al. |
| 6,444,332 B1 | 9/2002 | Bettridge |
| 7,314,674 B2 | 1/2008 | Hazel et al. |
| 7,754,342 B2 | 7/2010 | Hazel et al. |
| 8,596,985 B2 | 12/2013 | Walker et al. |
| 9,394,448 B2 | 7/2016 | Belov |
| 9,598,775 B2 | 3/2017 | Belov |
| 9,777,583 B2 | 10/2017 | Leggett |
| 11,535,560 B2 * | 12/2022 | Belov ................... B05D 7/14 |
| 2017/0204275 A1 | 6/2017 | Pedoni et al. |
| 2020/0354276 A1 | 11/2020 | Belov et al. |

FOREIGN PATENT DOCUMENTS

WO    2022125224 A2    6/2022

* cited by examiner

*Primary Examiner* — Sheeba Ahmed

(57) ABSTRACT

Hexavalent chromium-free slurry formulations which are suitable in the production of inorganic overlay coating systems are described. The formulations provide superior hot corrosion and high-temperature oxidation protection for superalloy substrates. A basecoat slurry and topcoat slurry are provided. The basecoat slurry includes an aluminum phosphate based aqueous solution having a molar ratio of Al:P higher than about 1:3 with the incorporation of pigments of either metallic particles, or metal oxide particles, or both in combination. The topcoat slurry includes an aluminum phosphate based aqueous solution having a molar ratio of Al:P higher than about 1:3. An inorganic overlay coating formed on substrate made from the slurry formulation of present invention for hot corrosion protection on superalloy substrate against hot corrosion. Furthermore, a multilayer coating comprises a metallic bond coat and an inorganic overlay coating formed on superalloy substrate to further enhance high-temperature oxidation and hot corrosion protection.

25 Claims, 10 Drawing Sheets

Figure 1. Schematic of an inorganic overlay coating system of the present invention comprising a basecoat and a topcoat.

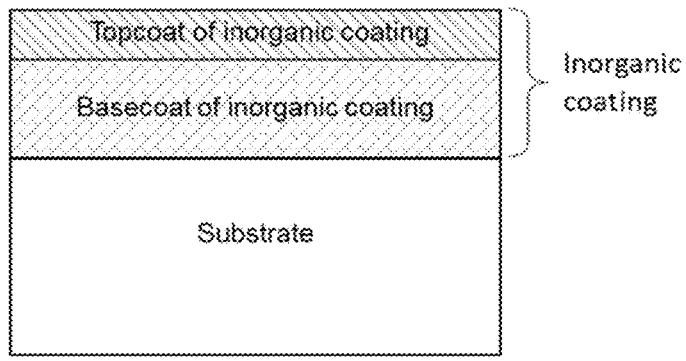

Figure 2. The inorganic coating of the present invention after thermal cycling test at 1500°F (815°C).

Fig. 2(a): after 140 cycles    Fig. 2(b): after 260 cycles    Fig. 2(c): after 400 cycles

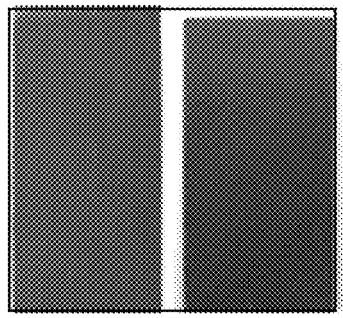 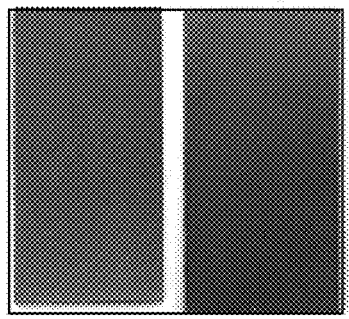 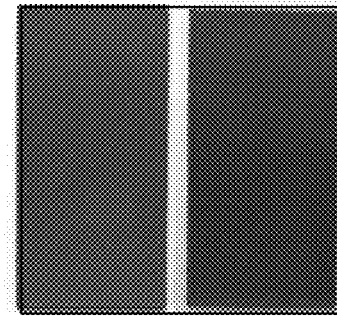

Figure 3. Surface morphology of the inorganic coating of the present invention in thermal cycling test: after 200 cycles in air at 1500°F (815°C).

Fig. 3(a): optical microscopy (x40)    Fig. 3(b): SEM (x500)

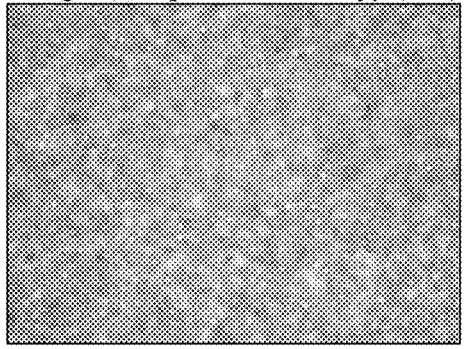 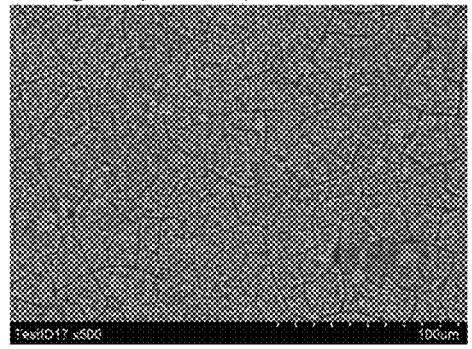

Figure 4. Thermal analysis of Aluminum Phosphate binders with different Al:P molar ratios Al:P = 1:3 (stoichiometric Al(H₂PO₄)₃); Al: P equals to about 1:2.7; Al: P equals to about 1:2.4.

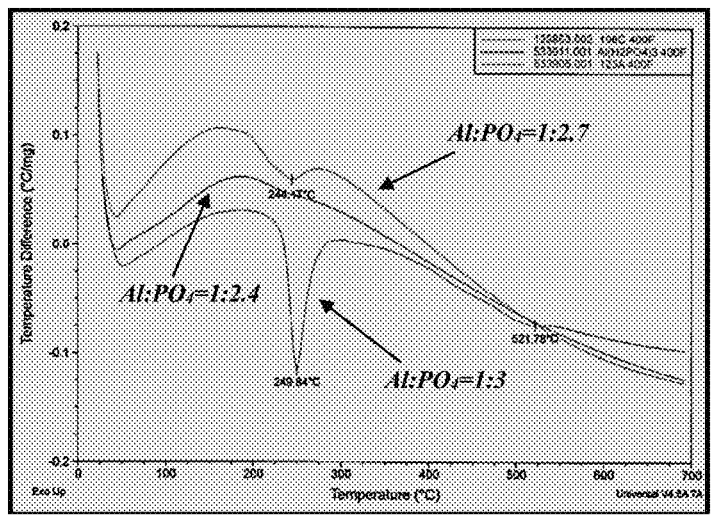

Figure 5. The inorganic coating of the present invention in thermal cycling test in the absence of deposit of corrosive sulfates: Visual appearance before test (a), visual appearance after test (b) of 100 cycles in air at 1310°F (710°C) and after-test cross-sectional SEM (c).

Fig. 5(a)    Fig. 5(b)    Fig. 5(c)

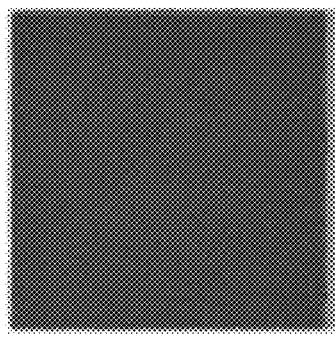 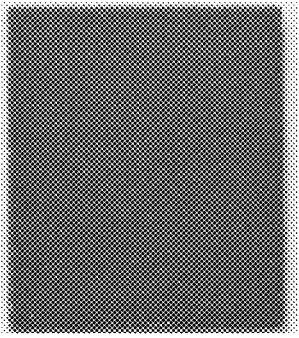 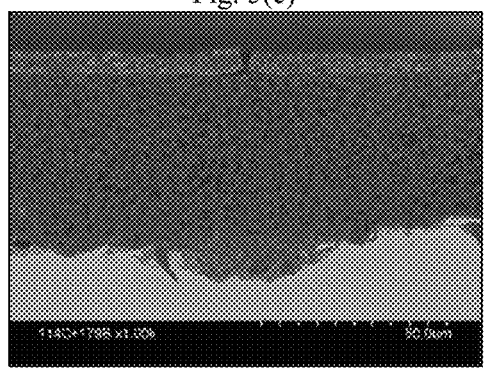

Figure 6. Sulfate attack on bare superalloy substrate, Rene 80: weight loss in Thermal Cycling Test at 1310°F (710°C).
1st Test performed with Mixture A; 2nd Test performed with Mixture B.
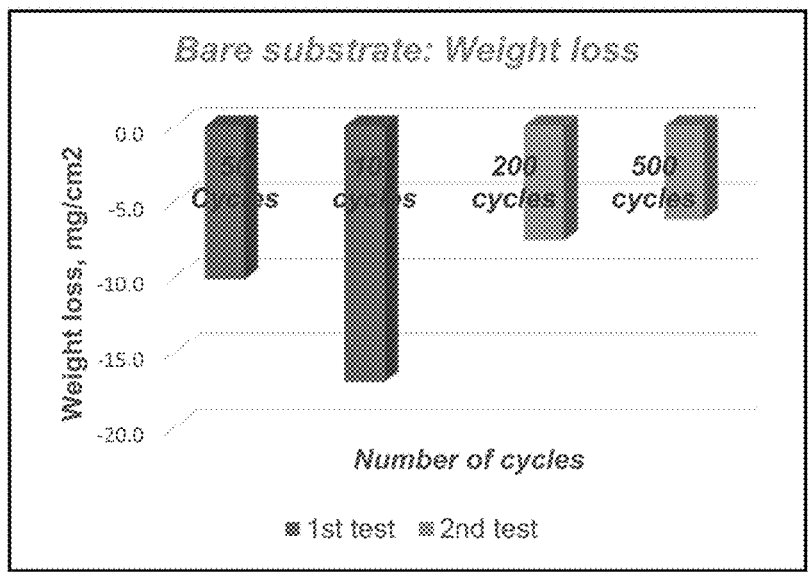
Figure 7 Sulfate attack on bare superalloy substrate, Rene 80: Cross-sectional SEM after Thermal Cycling Test at 1310°F (710°C).
Fig. 7(a). Test with Mixture A: after 100 cycles
Fig 7(b). Test with Mixture B: after 500 cycles
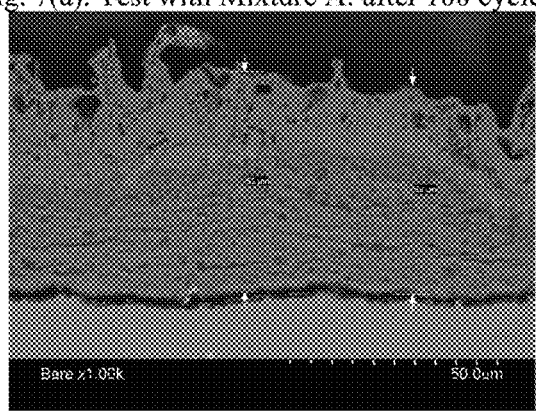
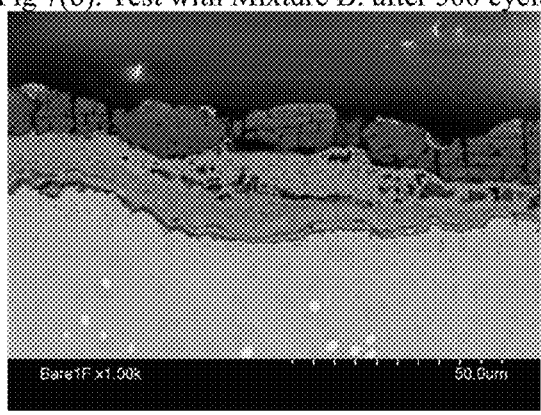

Figure 8. Thermal cycling test in the presence of aggressive Mixture A deposit of corrosive sulfates: Visual appearance of the inorganic coating of the present invention (a) vs. prior art Cr(VI) containing coating system (b) after 100 cycles at 1310°F (710°C).

Fig. 8(a)　　　　　　　　　　Fig. 8(b)

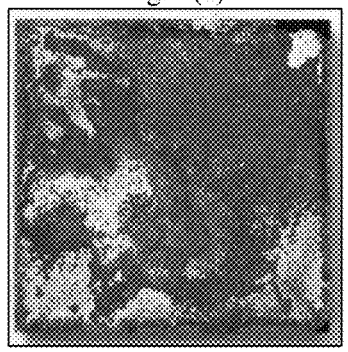 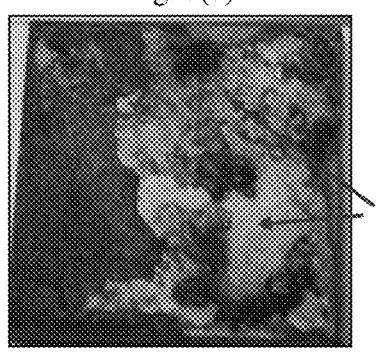

Bare substrate exposed

Figure 9. Thermal cycling test in the presence of Mixture A deposit of corrosive sulfates at 1310°F (710°C): Bare substrates vs. substrates coated with the Cr(VI)-free inorganic coating of the present invention.

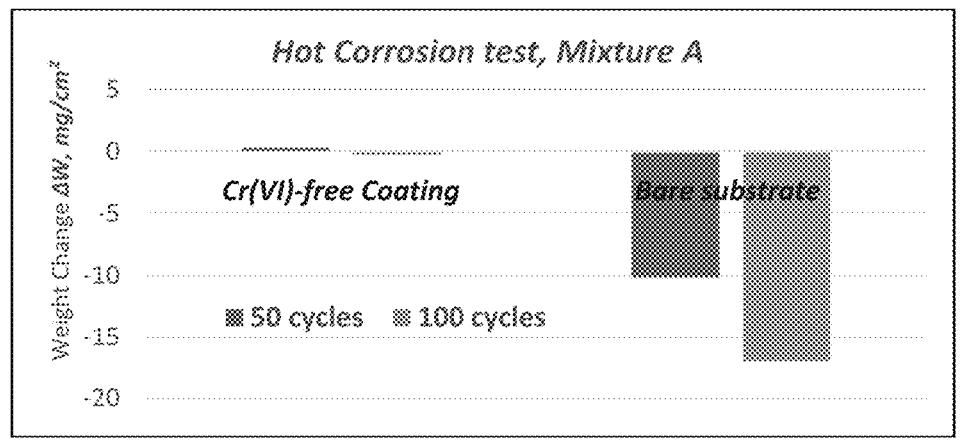

Figure 10, Thermal cycling test of the inorganic coating of the present invention: Cross-sectional SEM after 100 cycles at 1310°F (710°C) without sulfate (a) and with deposit of aggressive Mixture A (b).

Fig. 10(a)   Fig. 10(b)

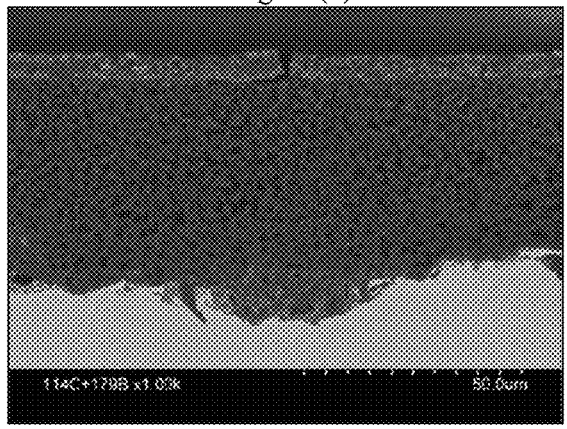
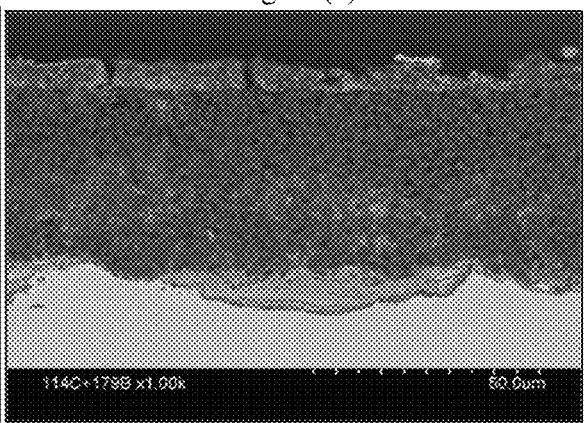

Figure 11. Thermal Cycling Test with Mixture B sulfate deposit at 1310°F (710°C): Cr (VI)-free inorganic coating of the present invention as-prepared (a), after 100 (b) and after 500 cycles (c).

Fig. 11(a) As-prepared   Fig. 11(b) 100 cycles   Fig. 11(c) 500 cycles

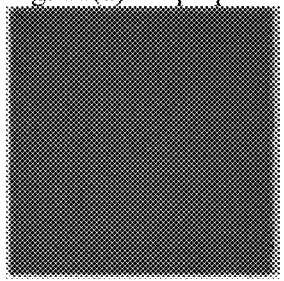
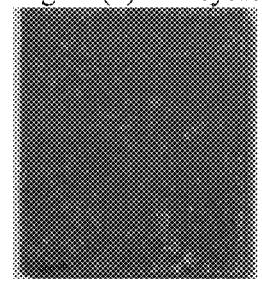

Figure 12. Thermal cycling test of the inorganic coating system of the present invention: Cross-sectional SEM after 100 cycles (a) and after 500 cycles (b) at 1310°F (710°C) with deposit of Mixture B sulfates.

Fig. 12(a)                              Fig. 12(b)

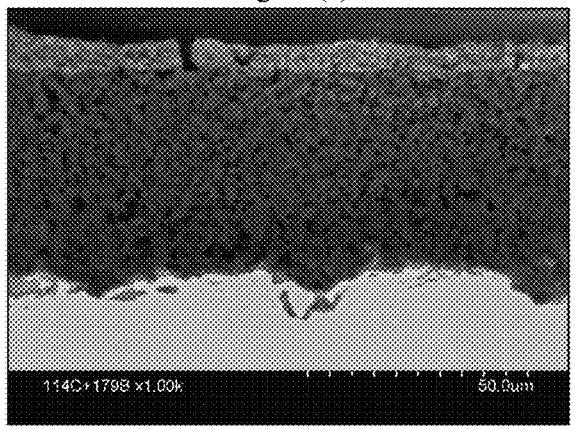
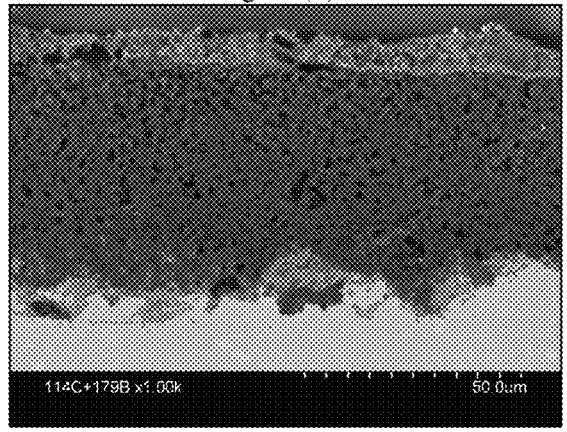

Figures 13(a), 13(b) and 13(c) show a visual appearance of the samples coated with the Cr(VI)-containing system prepared in accordance with U.S. Patent 7,314,674; the samples are shown (a) before testing, (b) after 100 cycles and (c) after 500 cycles of thermal cycling test with Mixture B sulfate deposit at 1310°F (710°C), thus demonstrating an inferior performance of this commercially available coating system, in comparison to the Cr(VI)-free coating system of the present invention, as described in Comparative Example 1.

Fig. 13(a) As-prepared     Fig. 13(b) after 100 cycles     Fig. 13(c) after 500 cycles

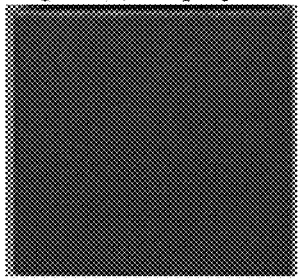
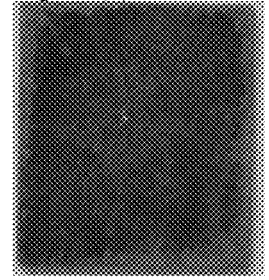
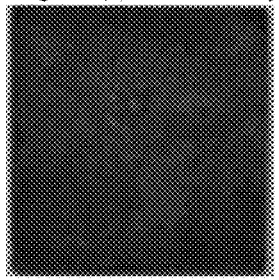

Figure 14. Thermal cycling test with Mixture B sulfate deposit at 1310°F (710°C): Bare substrates vs. substrates coated with the Cr(VI)-free inorganic coating of the invention and Cr(VI)-containing coating system (sample G and H) of the prior art as in Comparative Example 1.

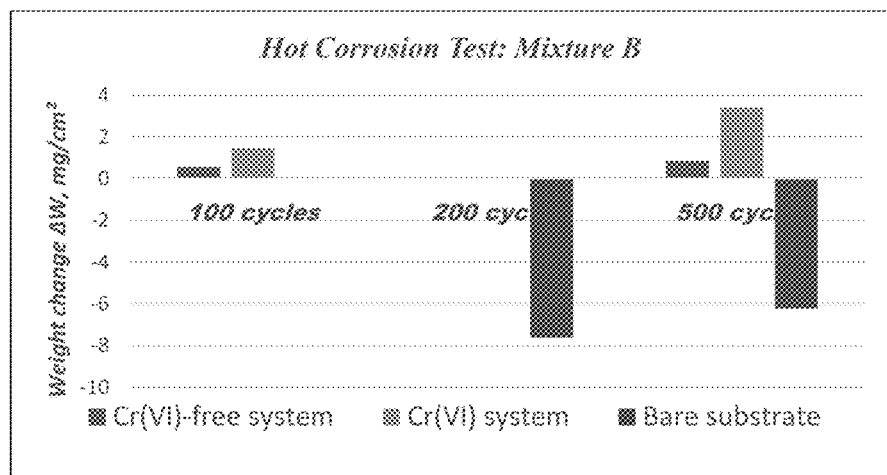

Figure 15. Thermal cycling test with Mixture A sulfates at 1310°F (710°C) for 150 cycles: Bare substrates vs. substrates coated with the Cr(VI)-free inorganic coating system (sample K) of the present invention and Cr(VI)-containing coating systems (sample I and J) of the prior art as in Comparative Example 2

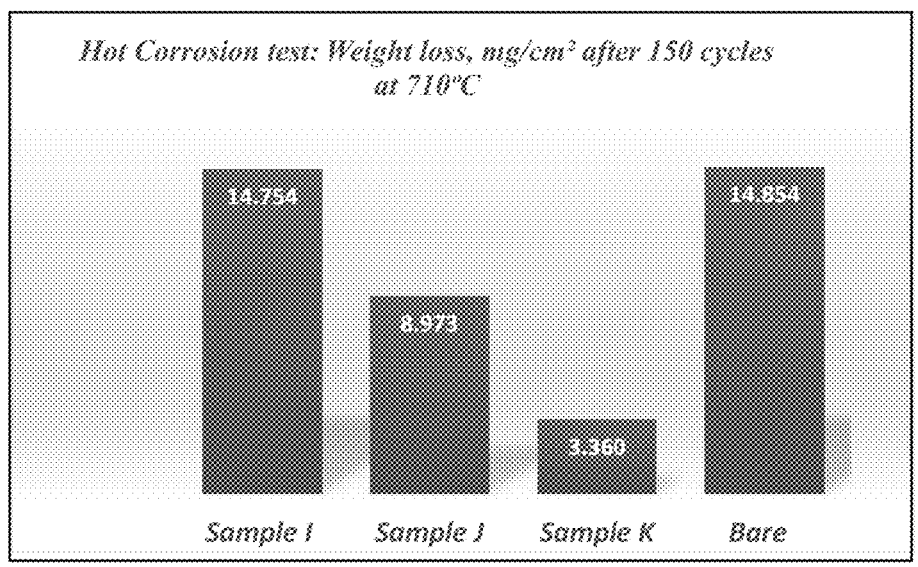

Figure 16. Thermal cycling test with Mixture A sulfates at 1310°F (710°C) for 50 cycles: Substrates coated with the Cr(VI)-free coating System with Li-doped Potassium silicate-based basecoat as in Comparative Example 3.

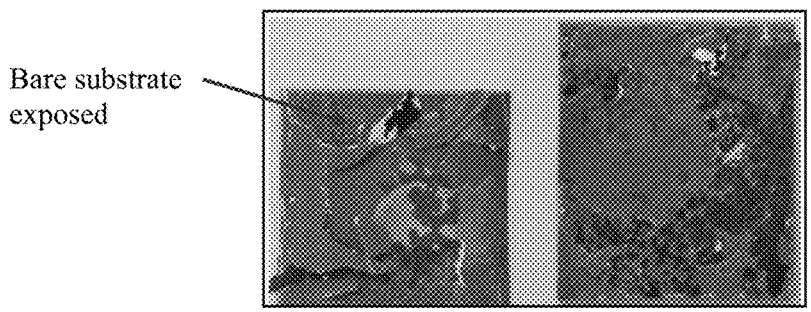

Bare substrate exposed

Figure 17. A schematic of a durable multilayer coating system of the present invention comprising a metallic bond coat and an inorganic overlay coating, wherein the inorganic overlay coating comprising a basecoat and a topcoat.

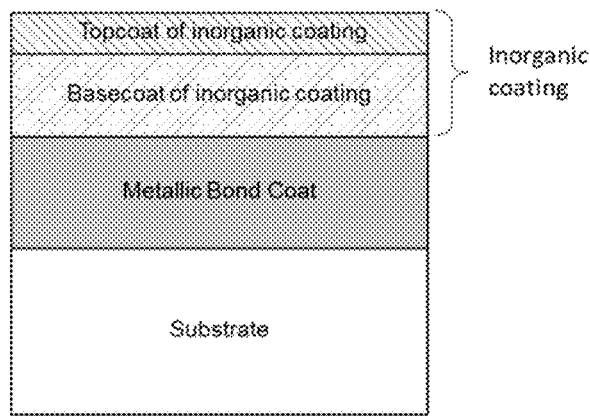

Figure 18. The maximum corrosion pit depth after 200 hour and 500 hour hot corrosion test at 710°C (1310°F) for multilayer coating and inorganic overlay coating of the present inventions in comparison to aluminide coating and uncoated superalloy CMSX-4.
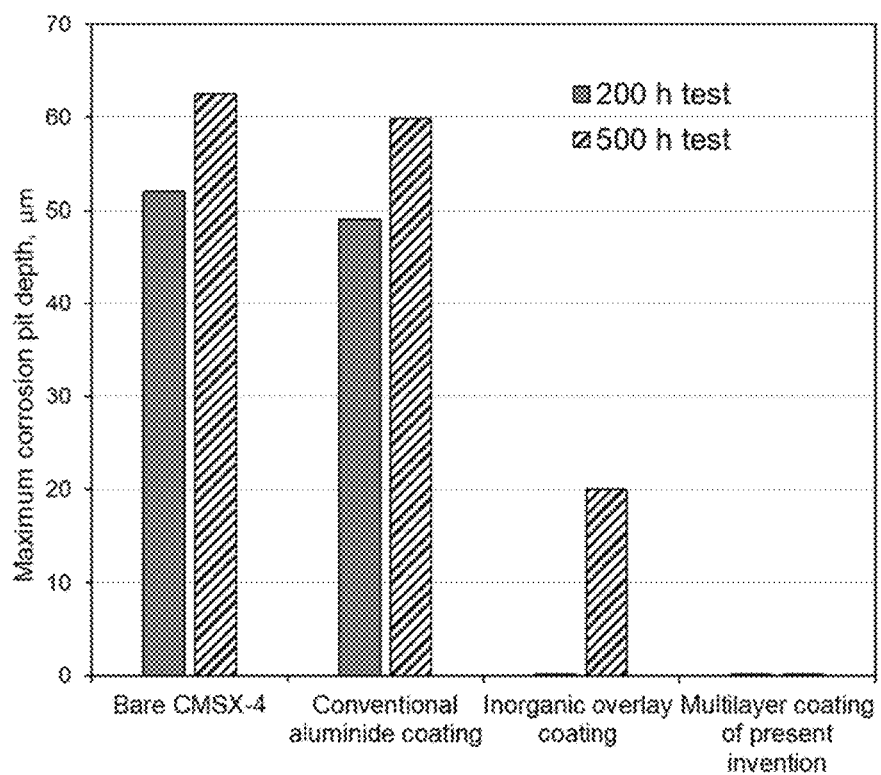

Figure 19. The cross-sectional images show zero corrosion pit for multilayer coating (a) and about 20 micrometer corrosion pit depth of inorganic overlay coating (b) of present invention after 500h corrosion test with mixture A in comparison to about 60 micrometer corrosion pit depth of conventional aluminide coating (c) and uncoated CMSX-4 (d).

CHROMATE-FREE INORGANIC COATING SYSTEMS FOR HOT CORROSION PROTECTION OF SUPERALLOY SUBSTRATE

RELATED APPLICATIONS

This application claims the benefit of priority from U.S. Serial Application No. 63/110,590, filed on Nov. 6, 2020, which is incorporated herein by reference, in its entirety.

FIELD OF INVENTION

The present invention relates to novel hexavalent chromium-free slurry formulations which are suitable in the production of an inorganic overlay coating and a durable multilayer coating system providing superior hot corrosion and high-temperature oxidation protection for superalloy substrates and capable of replacing traditional hexavalent chromium (Cr(VI))-containing slurries and coatings. The slurry formulations and coatings are particularly suitable for use on turbine engine components.

BACKGROUND OF THE INVENTION

The surfaces of turbine engine components are exposed to hot gases from the turbine combustion process. Turbine engine superalloy materials are selected based on their high temperature stability and corrosion resistance. Typically, gas turbine engine components are composed of nickel-based superalloys with generally acceptable high temperature mechanical properties, such as fatigue resistance, as well as generally acceptable resistance to oxidation and corrosion damage. Today, various superalloys are commercially available, such as Inconel®718, Inconel®722, Udimet®720, Rene®65 and Rene®88. These superalloys along with others have been extensively studied and discussed in the literature. As an example, typical compositions and advances in nickel-based superalloys used for turbine discs have been reviewed and discussed by Pollock et. al. in "Nickel-based Superalloys for Advanced Turbine Engines: Chemistry, Microstructure and Properties", J. Propulsion and Power, v. 22, 2, 2006. However, many of today's nickel-based superalloy materials are susceptible to degradation under severe conditions at high operating temperatures. Additionally, newer generation disc superalloys contain lower concentrations of chromium, thus being less resistant to so-called hot corrosion (i.e., sulfidation-caused) attack.

"Hot corrosion" as used herein and throughout is defined as the attack of molten or fused sulfate salts directly on metallic components, specifically on nickel-based alloys. Hot corrosion has been identified and combated in the turbine engines for many years. There are two primary types of hot corrosion. The first type of hot corrosion is so-called high-temperature Type 1 hot corrosion, which is normally observed in the temperature range of about 825-950° C. (1517-1742° F.), and most aggressively occurs at about 885° C. (1625° F.). The second type of hot corrosion is low-temperature Type 2 hot corrosion, which is most aggressive around 700° C. (1292° F.). The temperature of the last stages of a compressor can reach and exceed 1300° F. Components including but not limited to nickel-based alloy blades, vanes, disks, and seals that operate at 1300° F. or higher in the last stages of a compressor are susceptible to pitting damage from low-temperature Type 2 hot corrosion caused by sulfates accumulating on the surface of such components. The varying mixtures of alkali and alkaline earth sulfates (e.g., sodium, magnesium, potassium, and calcium) can be ingested with the inlet air in marine environments or form as a result of a combustion process.

Oxidation and corrosion reactions at the surface of the components can cause metal wastage and loss of wall thickness. The loss of metal rapidly increases the stresses on the respective components and can ultimately result in component failure. Protective coatings are thus applied to the components to protect them from degradation by oxidation and sulfidation corrosion.

The coatings used to protect superalloys are generally divided into diffusion and overlay coating groups. An example of diffusion coatings are the aluminides, the enrichment of the surface of an alloy, such as a nickel-based alloy, with aluminum to form intermetallic compounds, such as nickel aluminide.

Also, hot corrosion attack on superalloy components can be limited by a "chromizing process", in which chromium is diffused to produce intermetallic compounds on the surface of the components. Processes have been developed to modify intermetallic compounds created by diffusion by the addition of metals such as Platinum, Palladium, and/or Rhodium. The modified intermetallic coatings are more expensive by virtue of incorporating precious metals, but often exhibit improved resistance to sulfidation corrosion. For example, U.S. Pat. No. 9,777,583 to Leggett discloses a protective coating applied on a shank and a root of a gas turbine blade; the protective coating comprises platinum and chromium creating a chromium-rich outer oxide scale on top of the coating, thus minimizing a diffusion path for sulfur attack on the base material.

Although often efficient in protecting against Type 2 hot corrosion attack, all types of diffusion-derived coatings have a common disadvantage of high processing temperatures required for the diffusion process to take place to form desirable intermetallic phases in the surface layer of the base material. Specifically, heat treatment may involve a temperature within the range of 850° C. to 1150° C. (1562° F.-2102° F.). As an additional shortcoming, formation of diffusion-derived coatings may require a controlled atmosphere, such as argon or vacuum processing.

Another option for the protection of superalloys is overlay coatings. Commercially employed ceramic overlay coatings usually can be formed by curing at 315-340° C. (599-644° F.) in air, thus making processing much easier and less costly in comparison to application of diffusion coatings.

Various multilayer overlay systems have been suggested and used to protect turbine engine components. However, assessment of the commercially available overlay systems has revealed general deficiencies in their compositions and functional properties, as well as several possible failure modes.

For example, a commercially available multilayer overlay system (known as SermaFlow® N3000) provides a generally acceptable smooth, antifouling surface, thus preventing deposits of corrodants. The SermaFlow® N3000 system comprises a chromate-phosphate binder filled with metal oxide pigments (in particular, aluminum oxide $Al_2O_3$ and chromium oxide $Cr_2O_3$) and provides efficient protection against Type 2 hot corrosion caused by a less aggressive corrosive mixture of calcium sulfate and carbon black, as discussed by B. G. McMordie in "Impact of Smooth Coatings on the Efficiency of Modern Turbomachinery", Aerospace/Airline Plating & Metal Finishing Forum, Cincinnati, Ohio, Mar. 27-29, 2000. However, the SermaFlow® N3000 system has been designed for lower service temperatures and is therefore prone to cracking and delamination at elevated operating temperatures (≥~1300° F., 704° C.) which can be encountered at the last compressor stages in newer engines.

This shortcoming of the SermaFlow® N3000 coating system was overcome by the multilayer overlay system described and patented in U.S. Pat. No. 9,598,775 to Belov. The patented multilayer overlay system exhibits improved corrosion and thermal stability at temperatures of up to 1400° F. (760° C.) when exposed to the same corrosive mixture of calcium sulfate and carbon black. However, as will be shown below in the detailed description and comparative examples of the present invention, the multilayer system of U.S. Pat. No. 9,598,775 fails to provide adequate protection from a more aggressive corrosive mixture of molten alkali sulfates and alkaline earth sulfates.

Another composition of overlay coating system recognized for protection of turbine components against Type 2 hot corrosion attack is described in several U.S. patents to Hazel et. al., such as in U.S. Pat. Nos. 7,314,674 and 7,754,342 ("the Hazel Patents"), wherein corrosion resistant coating compositions comprise a glass-forming binder component and a particulate corrosion-resistant component. The glass-forming binder component forms a phosphate-containing or silica-based matrix. The particulate corrosion-resistant component comprises aluminum oxide (i.e. alumina) particles and non-alumina metal alloy particles (such as MCrAlY alloy particles, where M represents a nickel or nickel-cobalt alloy). According to Hazel et. al., the non-alumina particulate has a coefficient of thermal expansion (CTE) greater than that of alumina, and can comprise from 5 to 100% of the total particulate content in the coating composition. The role of the non-alumina metal alloy particulate in the coating compositions of the Hazel Patents is to mitigate CTE mismatch between the coating and the underlying metal substrate which makes the coating prone to spallation when subject to thermal cycling and/or cyclic mechanical strain at elevated temperatures of about 1200° F. (649° C.) or higher.

The functional performance of the ceramic overlay systems for Type 2 hot corrosion protection can be further enhanced when they are employed not as stand-alone protective layers, but in combination with diffusion bond coatings for increasing durability of the protective systems and providing additional resistance to oxidation and sulfidation of the base material. For example, U.S. Pat. No. 8,596,985 to Walker et. al. describes a method of protecting a turbine component from the effect of hot corrosion by applying a chromium diffusion coating in combination with an overlay coating of ceramic material, whereas the ceramic coating comprises a chromate-phosphate binder matrix filled with metal oxide particles, such as particles of aluminum oxide $Al_2O_3$, titanium oxide $TiO_2$ or chromium oxide $Cr_2O_3$.

An overarching concern related to commercially employed overlay systems for hot corrosion protection, such as SermaFlow® N3000, the overlay systems disclosed in the U.S. Pat. Nos. 9,598,775; 8,596,985; 7,314,674; etc., is the presence of hexavalent chromium (Cr(VI)) in the chromate-phosphate binder of these ceramic layers and precursors.

Ceramic coating compositions based on chromate-phosphate binder compositions have been well known and considered for decades as the industry standard for forming coatings which are highly corrosion-resistant and heat-resistant. For example, U.S. Pat. No. 3,248,251 to Allen over forty years ago recognized and described the ability of aluminum-ceramic chromium(VI)-containing coatings to exhibit resistance to corrosion, heat and abrasion while retaining adhesion and flexibility. Additionally, U.S. Pat. Nos. 4,537,632; 4,606,967; and 4,544,408 to Mosser et al. describe corrosion resistant coating compositions comprising chromate-phosphate binder systems filled with aluminum metal or aluminum oxide pigments. Today, these aluminum-ceramic coatings are relied upon by original equipment manufacturers (OEM's) in the aircraft and power generation industries for protection of various engine components subject to high temperature and corrosive environments.

Notwithstanding the widespread utility of the abovementioned ceramic coatings, hexavalent chromium Cr(VI) has been identified as an health and environmentally hazardous material of concern. Consequently, Cr(VI) containing compounds has been targeted for elimination in accordance with recent changes in the policies of the Department of Defense (DoD), Air Force and various OEMs. The impact of the policy changes has created a need for Cr(VI)-free coatings that can exhibit functional performance properties at least the same as that of the ceramic coatings with Cr(VI)-based binders.

A two-layer protective coating system that is free of hexavalent chromium is disclosed in U.S. Pat. No. 6,444,332 to Bettridge. The Bettridge coating system comprises a chromized coating diffused into the surface of the metallic component and an overlay glass coating on the chromized coating, wherein the overlay glass coating preferably comprises a boron titanate silicate glass having a chromium oxide filler. This coating system provides oxidation and sulfidation resistance for the shank and root of the turbine blade. Although the overlay glass coating is free of hexavalent chromium, both layers of the disclosed protective system require high processing temperatures of 1050° C.-1100° C. (1922° F.-2012° F.) to diffuse the chromizing layer and 1030° C. (1886° F.) to form the overlay glass coating. Also, the fused glass is known to be not mechanically advantageous as a result of being prone to cracking and shattering easily under impact.

In view of the aforementioned deficiencies with today's coating systems, there is a continuing need for improved coating systems that are based on hexavalent chromium-free binders and are capable of providing efficient hot corrosion protection for nickel-based superalloys against molten and/or fused sulfates attack.

SUMMARY OF THE INVENTION

The invention relates, in part, to slurries used to produce coating compositions with special properties. It has been found that utilizing a chromium-free aluminum phosphate-based coating system comprising a basecoat that is sealed with a top coat produces an inorganic overlay coating exhibiting superior cyclic hot corrosion resistance and which is capable of replacing traditional chromate-containing coating systems.

In a first aspect, an aqueous slurry composition for the production of a inorganic overlay coating system for hot corrosion protection of a substrate is provided, comprising: a basecoat slurry, comprising: a first binder comprising an aluminum phosphate based aqueous solution having a molar ratio of Al:P higher than about 1:3, the first binder characterized by an absence of hexavalent chromium; and pigment of either metallic particles, metal oxide particles, or both in combination incorporated into the first binder; a topcoat slurry, comprising: a second binder comprising an aluminum phosphate based aqueous solution having a molar ratio of Al:P higher than about 1:3, the second binder characterized by an absence of hexavalent chromium.

In a second aspect, a inorganic overlay coating system for hot corrosion protection of a substrate is provided, comprising: a substrate; a basecoat on said substrate, said basecoat comprising: the first aluminum phosphate-based binder having a molar ratio of Al:P of higher than about 1:3, and pigments of either metallic particles, metal oxide particles, or both in combination embedded within said first aluminum-phosphate binder; a topcoat, comprising: the second aluminum phosphate-based binder having a molar ratio of Al:P of higher than about 1:3.

In a third aspect, a durable multilayer coating system for enhanced high-temperature oxidation & hot corrosion protection, formed onto a substrate from aqueous slurry compositions of the present invention. The multilayer coating comprises a metallic bond coat adjacent to a substrate, and an inorganic overlay coating on said metallic bond coat. The metallic bond coat protects substrate against high-temperature oxidation attack. The said inorganic overlay coating comprises a basecoat adjacent to said metallic bond coat and a topcoat onto basecoat. The basecoat of said inorganic coating comprises the first aluminum phosphate-based binder having a molar ratio of Al:P of higher than about 1:3, and pigments of either metallic particles, metal oxide particles, or in combination embedded within said first aluminum-phosphate binder. The topcoat of said inorganic coating comprises the second aluminum phosphate-based binder having a molar ratio of Al:P of higher than about 1:3.

BRIEF DESCRIPTION OF THE DRAWINGS

The objectives and advantages of the invention will be better understood from the following detailed description of the preferred embodiments thereof in connection with the accompanying figures wherein like numbers denote same features throughout and wherein:

FIG. 1, a schematic of an inorganic overlay coating system of the present invention comprising a basecoat and a topcoat.

FIGS. 2(a), 2(b), and 2(c) show the inorganic coating of the present invention after thermal cycling test in air at 1500° F. (815° C.): after 140 cycles, after 260 cycles and after 400 cycles, respectively.

FIGS. 3(a) and 3(b) present surface morphology of the inorganic coating of the present invention in thermal cycling test: optical microscopy (at ×40 magnification, FIG. 2(a)) and SEM micrographs (at ×500 magnification, FIG. 2(b)) were taken after 200 cycles in air at 1500° F. (815° C.).

FIG. 4 provides results of differential thermal analysis (DTA) of Aluminum phosphate based binders with different aluminum to phosphate molar ratios to illustrate the phase transformations vs. Al:P ratio: Al:P=1:3 of stoichiometric aluminum phosphate $Al(H_2PO_4)_3$; Al:P equals to about 1:2.7; Al:P equals to about 1:2.4.

FIGS. 5(a) and 5(b) show the inorganic coating of the present invention in thermal cycling test in the absence of deposit of corrosive sulfates and demonstrates its visual appearance before test (FIG. 5(a)), as well as visual appearance (FIG. 5(b)) and cross-sectional SEM (FIG. 5(c)) after 100 cycles in air at 1310° F. (710° C.).

FIG. 6 provides baseline data on corrosive attack of sulfates Mixture A and Mixture B on bare super alloy substrate, Rene 80, measured as a loss of metal in the thermal cycling test at 1310° F. (710° C.); the graph in FIG. 6 summarizes results of two tests performed with two different sulfate mixtures A and B.

FIGS. 7(a) and 7(b) present cross-sectional SEM data on ×1000 magnification of bare super alloy substrate, Rene 80, demonstrating corrosion products scale formation in a thermal cyclic test at 1310° F. (710° C.) performed with sulfate deposits of Mixture A after 100 cycles (FIG. 7(a)) and Mixture B after 500 cycles (FIG. 7(b)).

FIGS. 8(a) and 8(b) show that, from visual appearance, Cr(VI)-free inorganic coating of the present invention is superior on performance in comparison with a commercially available Cr(VI) containing coating system after 100 cycles at 1310° F. (710° C.) in the presence of aggressive Mixture A deposit of corrosive sulfates.

FIG. 9 demonstrates that the inorganic coating of the present invention efficiently prevents weight loss in the thermal cycling test in the presence of Mixture A of corrosive sulfates at 1310° F. (710° C.), as compared to the bare substrate.

FIGS. 10(a) and 10(b) present cross-sectional SEM data on 1000× magnification for the inorganic coating of the present invention after 100 cycles at 1310° F. (710° C.) performed without sulfate deposit and with aggressive sulfate Mixture A, as described in Example 2.

FIG. 11(a) shows a visual appearance of the samples coated with the inventive inorganic coating system before testing; and FIG. 11(b) shows a visual appearance of the samples coated with the inventive inorganic coating system after thermal cycling test with Mixture B sulfate deposit at 1310° F. (710° C.) after 100 cycles and FIG. 11(c) shows a visual appearance of the samples coated with the inventive inorganic coating system after thermal cycling test with Mixture B sulfate deposit at 1310° F. (710° C.) after 500 cycles, thus demonstrating that the base coat Cr(VI)-free layers were preserved throughout the whole test.

FIGS. 12(a) and 12(b) present cross-sectional SEM data on 1000× magnification for the inorganic coating of the invention after 100 cycles and after 500 cycles, correspondingly, at 1310° F. (710° C.) performed with less aggressive sulfate Mixture B deposit, as described in Example 3.

FIGS. 13(a), 13(b) and 13(c) show a visual appearance of the samples coated with the Cr(VI)-containing system prepared in accordance with U.S. Pat. No. 7,314,674; the samples are shown before testing (FIG. 13(a)) and after a thermal cycling test with Mixture B sulfate deposit at 1310° F. (710° C.) (FIGS. 13(b) after 100 cycles and 13(c) after 500 cycles), thus demonstrating an inferior performance of this commercially available coating system, in comparison to the Cr(VI)-free coating system of the present invention, as described in Comparative Example 1.

FIG. 14 compares the weight change in thermal cycling test at 1310° F. (710° C.) with Mixture B sulfate deposit for the bare substrate, as compared to the commercially available Cr(VI)-containing coating of Comparative Example 1, as well as to the Cr(VI)-free coating of the present invention.

FIG. 15 compares the weight loss after 150 cycles of thermal cycling testing at 1310° F. (710° C.) with exposure to Mixture A sulfate deposit for a bare substrate vs. two different Cr(VI)-containing coating systems (sample I and J) and the Cr(VI)-free inorganic coating (sample K) of the present invention, as described in Comparative Example 2.

FIG. 16 demonstrates performance failure of a Cr(VI)-free coating system with a Lithium-doped Potassium silicate-based basecoat, as described in Comparative Example 3, after subject to 50 cycles of thermal cycling testing at 1310° F. (710° C.) in the presence of aggressive Mixture A deposit of corrosive sulfates.

FIG. 17 shows a schematic of a durable multilayer coating system of the present invention comprising a metallic bond coat and an inorganic overlay coating, wherein the inorganic overlay coating comprises a basecoat and a topcoat.

FIG. 18 illustrates the maximum corrosion pit depth after 200 hour and 500 hour hot corrosion test at 1310° F. (710° C.) for multilayer coating and inorganic overlay coating of the present inventions in comparison to aluminide coating and uncoated superalloy CMSX-4.

DETAILED DESCRIPTION OF THE INVENTION

Figure 19A:
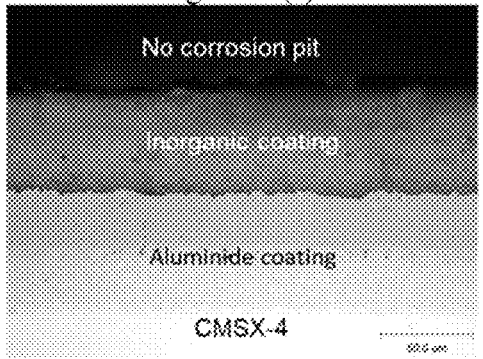
FIG. 19(a) shows the cross-sectional image showing zero corrosion pit for multilayer coating (a)

The relationship and function of the various elements of this invention are better understood by the following detailed description. However, the embodiments of this invention as described below are by way of example only. The detailed description contemplates the features, aspects and embodiments in various permutations and combinations, as being within the scope of the detailed description. The detailed description may therefore be specified as comprising, consisting or consisting essentially of, any of such combinations and permutations of these specific features, aspects, and embodiments, or a selected one or ones thereof.

The invention relates, in part, to slurry formulations used to produce an inorganic overlay coating and a multilayer coating system with special properties. Compositions of binder materials and specific combinations of the binder materials and pigment particles have been found to affect the morphology and microstructure of the resultant inorganic coating, resulting in a coated product that has superior functional properties in comparison to conventional coating systems. Furthermore, the use of a metallic bond coat between inorganic coating and substrate further enhances performance. The coated products of the present invention are advantageous for several applications, and particularly advantageous in aerospace and power generation applications.

Aqueous slurry compositions of the present invention can be used to create a protective coating or coating systems onto various solid substrates, including, by way of example, ferrous alloys, nickel-based alloys, nickel-cobalt based alloys, and other metallic alloys (such as aluminum-based alloys, cobalt-based alloys, etc.). It should be understood that the aqueous slurry compositions of the present invention can also be used to create a protective coating or coating system onto nonmetallic thermally stable surfaces, such as ceramics. While the aqueous slurry compositions of the present invention are most advantageous for protecting Ni-based superalloys from detrimental effects of hot corrosion attack, any solid substrate may be suitable for the application of the coating of the present invention, provided that the solid substrate is preferably capable of withstanding coating processing temperatures of about 600-650° F. (315-343° C.).

In one aspect of the present invention, aqueous slurry compositions for the production of an inorganic overlay coating system are provided. The aqueous slurry composition comprises a basecoat slurry. The basecoat slurry includes a first chromate-free, aluminum phosphate-based binder. Preferably, the first aluminum phosphate-based binder has a molar ratio of Al:P of higher than about 1:3. The first aluminum phosphate-based binder is incorporated with pigment of either metallic particles or metal oxide particles or both in combination. The metallic particles or metal oxide particles or in combination of the said pigment are chemically resistant to molten alkali metal sulfates at high temperature. Preferably, the first aluminum phosphate based binder is incorporated with aluminum oxide pigment particles. The aqueous slurry composition further includes a topcoat slurry, which also comprises an aqueous solution of a second aluminum phosphate based binder having a molar ratio of Al:P of higher than about 1:3. The second aluminum phosphate based binder in the top coat slurry can be pigment free. Preferably, the second aluminum phosphate based binder in the top coat slurry is incorporated with pigment of metal oxide particles, such as chromium (III) oxide $Cr_2O_3$.

In the other aspect of the present invention. A inorganic overlay coating for hot corrosion protection, formed onto a substrate from aqueous slurry compositions of the present invention. The inorganic overlay coating comprises a basecoat adjacent to a substrate and a topcoat onto base coat. The basecoat of said inorganic coating comprises the first aluminum phosphate-based binder having a molar ratio of Al:P of higher than about 1:3, and pigments of either metallic particles, metal oxide particles, or both in combination embedded within said first aluminum phosphate binder. The metallic particles or metal oxide particles or both in combination of the said pigment are chemically resistant to molten alkali metal sulfates at high temperature. Preferably, the first aluminum phosphate based binder is incorporated with aluminum oxide particles. The volume percent of the first aluminum phosphate-based binder within the cured basecoat is 5 to 50%. And the pigment accounts for 50 to 95%, by volume, of the cured basecoat. The topcoat of said inorganic coating comprises the second aluminum phosphate-based binder having a molar ratio of Al:P of higher than about 1:3. The second aluminum phosphate based binder in the topcoat can be pigment free. Preferably, the second aluminum phosphate based binder in the topcoat is incorporated with pigment of metal oxide particles, such as chromium (III) oxide $Cr_2O_3$. The aluminum phosphate-based binder in each of the basecoat and topcoat of the present invention does not contain Cr(VI) species, and therefore the aqueous slurry compositions and resultant inorganic overlay coating systems are hexavalent chromium-free.

In another aspect of the present invention. A durable multilayer coating system for enhanced high-temperature oxidation and hot corrosion protection, formed onto a substrate from aqueous slurry compositions of the present invention. The multilayer coating comprises a metallic bond coat adjacent to a substrate, and an inorganic overlay coating on said metallic bond coat. The metallic bond coat protects substrate against high-temperature oxidation attack. The said inorganic overlay coating comprises a basecoat adjacent to said metallic bond coat and a topcoat onto basecoat. The basecoat of said inorganic coating comprises the first aluminum phosphate-based binder having a molar ratio of Al:P of higher than about 1:3, and pigments of either metallic particles, metal oxide particles, or in combination embedded within said first aluminum-phosphate binder. The metallic particles or metal oxide particles or both in combination of the said pigment are chemically resistant to molten alkali metal sulfates. Preferably, the first aluminum phosphate based binder is incorporated with aluminum oxide particles.

The volume percent of the first aluminum phosphate-based binder within the cured basecoat is 5 to 50%. And pigment accounts for 50 to 95%, by volume, of the cured basecoat. The topcoat of said inorganic coating comprises the second aluminum phosphate-based binder having a molar ratio of Al:P of higher than about 1:3. The second aluminum phosphate based binder in the topcoat can be pigment free. Preferably, the second aluminum phosphate based binder in the topcoat is incorporated with pigment of metal oxide particles, such as chromium (III) oxide, $Cr_2O_3$.

It was discovered in the present invention that employing an aluminum phosphate-based binder composition with the chemically-resistant pigments of either metallic particles, metal oxide particles, or both in combination incorporated therein, wherein the binder comprises Aluminum, Al, and Phosphorus, P, species in Al:P molar ratio of higher than about 1:3, forms part of an overlay coating system that preserves adhesion to a metal substrate under thermal cycling and which is efficient in protecting superalloy substrates from corrosion attack by molten or fused alkali sulfates and alkaline earth sulfates at elevated temperatures typical of Type 2 hot corrosion attack. The molar ratio Al:P represents the ratio of the molar amount of aluminum-containing species from all sources, to the molar amount of phosphorus-containing species from all sources, such as phosphates. The molar ratio of Al:P in each of the resultant topcoat and the basecoat can range from about 1:2.1 to 1:2.9, more preferably from about 1:2.2 to 1:2.8, and most preferably from about 1:2.4 to 1:2.7. As will be shown in the examples, the overlay coating systems derived from the aqueous slurries of the present invention demonstrated an outstanding adhesion to superalloy substrates, as well as interlayer adhesion such that the coating system can withstand a thermal cycling in corrosive environments at elevated temperatures typical of Type 2 hot corrosion attack, of about 1300° F., without spallation, thus providing a stable and protective barrier from the corrodents.

Moreover, it was unexpectedly found that the hexavalent Cr(VI)-free coatings of the present invention provided significantly better functional performance than chromate-phosphate binder based commercial coating systems, such as SermaFlow N3000, the coating system disclosed in the U.S. Pat. No. 9,598,775, and equal or better performance that the coatings described in U.S. Pat. No. 7,314,674. Such findings by Applicants represent a significant departure from conventional systems. Prior to the emergence of the present invention, chromate-phosphate binder based coating systems, had been generally accepted as the benchmark in resistance to hot corrosion performance.

It was surprisingly found by Applicants, and as will be demonstrated in the Examples, when the first aluminum phosphate-based binders with a molar ratio of Al:P increased from 1:3 to about 1:2.7 and about 1:2.4, and were incorporated with micron-sized and chemically-resistant pigments of metallic particles, metal oxide particles, or both in combination to form basecoats of the present invention, the basecoats provided excellent adhesion to superalloy substrates. The basecoats of the present invention are sealed with a topcoat layer that comprises a second aluminum-phosphate based binder. The aluminum phosphate-based binder of the topcoat layer is preferably filled, embedded or otherwise generally incorporated with micron-sized chromium (III) oxide $Cr_2O_3$ pigment particles. The inorganic coating system was capable of withstanding thermal cycling in air at temperatures as high as 1500° F. (816° C.) without exhibiting any signs of coating spallation.

The inorganic overlay coating system shown in FIG. 1, in one aspect of the present invention comprises a basecoat having a first aluminum phosphate based binder with a molar ratio of Al:P equal to about 1:2.4, and the binder is incorporated with pigment of aluminum oxide particles. A topcoat comprises a second aluminum phosphate based binder with a molar ratio of Al:P equal to about 1:2.7, and the binder of the top coat is incorporated with $Cr_2O_3$ pigment particles. The resultant inorganic overlay coating of FIG. 1 has been applied to Inconel 718® substrates and the samples were exposed to thermal cycling in air (with a thermal cycle defined as having 50 minutes dwell in the hot zone, immediately followed by 10 minutes dwell at room temperature). There was no spallation of the coating observed, even after as many as 400 cycles (FIG. 2c) at the temperatures of the hot zone as high as 1500° F. (710° C.). Also, Applicants did not observe any increase in coating thickness. Additionally, the coating samples remained smooth and continuous (i.e., $R_a$<40 microinch before & after testing) with its morphology consistent and not deteriorated after the testing as shown in FIGS. 3(a) and 3(b).

The results are indeed surprising as compared with the findings disclosed in the U.S. Pat. Nos. 7,314,674; and 7,754,342 to Hazel et. al. ("the Hazel Patents"), which generally has represented conventional wisdom. According to the teachings of the Hazel Patents, corrosion-resistant coating layers comprising solely alumina particles in a phosphate or silica containing binder matrix, on a superalloy substrate fail and spall when subject to thermal cycling at elevated temperatures typical of Type 2 hot corrosion attack, such as 300 thermal cycles at 1400° F. (760° C.). The inventors in the Hazel Patents attributed the failure and spallation to a coefficient of thermal expansion (CTE) mismatch between the coating and substrate.

Contrary to the teachings of the Hazel Patents, Applicants have discovered that the specific compositional modification of the aluminum phosphate-based binder of the present invention, independent of coefficient of thermal expansion (CTE) of pigment particles embedded within said aluminum phosphate-based binder, may allow the coatings of the present invention, to not fail in the thermal cycling test, which is performed at even higher temperatures and longer exposures, In other words, the compositional modification of the aluminum phosphate-based binder of the present invention eliminates any detrimental CTE mismatch effects observed in the Hazel Patents, thus eliminating any need in employing specific pigment particles with CTE greater than alumina particles. Alternatively, other metal oxide particles and metallic particles which are corrosion resistant to molten sulfate at high temperature can be used as pigments within aluminum phosphate-based binder of the present invention. For example, the metal oxide particles of pigments within said basecoat can be selected from group of consisting of aluminum oxide, titanium oxide, zirconium oxide, and chromium oxides. The metallic particles of pigments within said base coat can be selected from the group of consisting of MCr, MAl, MCrAl, MCrAlY (where M=Ni, Co, Fe or in combination). The metallic particle has a minimum 15%, by weight, of chromium, or a minimum 6%, by weight, of aluminum. The metallic particles, metallic oxide particles or a combination thereof can have a particle size distribution characterized in that a $50^{th}$ percentile of the particle size distribution has a diameter of between about 1 to 10 microns.

Not to be bound by any theory, an absence of any heat induced transformations of a coating binder matrix at elevated service temperatures higher than about 1300° F.

may be a contributing factor in high tolerance toward thermal cycling stress demonstrated by the coating systems of the present invention.

Aluminum dihydrogen phosphate $Al(H_2PO_4)_3$ of stoichiometric composition with a molar ratio of Al:P of 1:3 is well known in the art as an efficient bonding agent for various ceramic materials (A. S. Wagh, Chemically Bonded Phosphate Ceramics, 2002) and is widely used in the refractory industry. When $Al(H_2PO_4)_3$ is heated, it loses water and a number of complex hydrates are formed; under further heat treatment, these complex hydrates decompose to form amorphous and crystalline aluminum phosphate phases with different stoichiometry; it is known in the art that the temperatures required to produce completely anhydrous aluminum phosphate phases are close to 500° C. (~930° F.), and subsequent transformations of anhydrous aluminum phosphate phases take place up to temperatures as high as 750° C. (~1380° F.) (e.g., see, M. Vipola et. al., J. Eur. Ceram. Soc., 22, 2002, pp. 1937-1946). This high temperature range of heat transformation completion makes stoichiometric aluminum dihydrogen phosphate $Al(H_2PO_4)_3$ with a molar ratio of Al:P=1:3 not suitable to serve as a binder for the slurry-derived coatings of the present invention with customary cure temperatures in the range of 600° F. to 1000° F. Heat transformations continuing above this cure temperature range would lead to volume changes in the matrix and mechanical stresses in the coating under service conditions and thus loss of the coating integrity and its spallation from the underlying substrate.

As recognized and disclosed previously by Applicants in U.S. Pat. No. 9,394,448 to Belov & Copeland, which is incorporated herein by reference in its entirety, the heat transformation path of the aluminum phosphate is strongly dependent on the Al:P molar ratio. Increasing the molar ratio of Al:P from 1:3 of the stoichiometric aluminum dihydrogen phosphate results in a reduction of the temperatures of completion of these transformations, thereby achieving a complete cure at temperatures in the range of 600° F. to 1000° F. U.S. Pat. No. 9,394,448 discloses that these aluminum phosphate based binders with a molar ratio of Al:P greater than 1:3 have been employed in the top coating compositions, in conjunction with a chromate-free basecoat of aluminum metal particles filled, embedded or incorporated into a silicate matrix. However, the disclosed coating system in U.S. Pat. No. 9,394,448 is suitable and generally intended for corrosion protection of steel substrates and components at temperatures not exceeding about 1200° F. (i.e., at temperatures below the melting temperature of Aluminum metal of 1220° F. (660° C.)). Thus, the coating system of U.S. Pat. No. 9,394,448 is not suitable for Type 2 hot corrosion protection above 1250° F. and cannot withstand service temperature conditions that the coatings of the present invention are specifically designed to withstand.

Applicants have recognized that a portion of their teachings in prior U.S. Pat. No. 9,394,448 to Belov & Copeland, is applicable in the present invention. Specifically, a compositional modification to stoichiometric aluminum dihydrogen phosphate involves increasing the molar ratio of Al:P from 1:3 of the stoichiometric aluminum dihydrogen phosphate to make the aluminum phosphate based binder suitable and beneficial for being employed in the inorganic overlay coating systems of the present invention, for both the basecoat and the top coat. It should be understood, however, unlike U.S. Pat. No. 9,394,448, the coating systems of the present invention are suitable for an entirely different application with entirely different service conditions, namely for Type 2 hot corrosion protection of superalloy substrates at higher temperature.

For a slurry-derived coating to be stable at a service temperature, any compositional and/or phase transformations of a binder must be completed during the coating cure process. Otherwise, internal stresses associated with the heat induced transitions can destroy a coating and can cause its delamination from a substrate under service conditions. In order to determine the effects of Al:P molar ratio on the curing process of aluminum phosphate-based binders of the present invention, the heat transformation path has been studied by Applicants by the thermal analysis method, as known in the art. The samples for this study were prepared by preheating small amounts of aluminum phosphates, each with different molar ratios of Al:P at 400° F. for 1 hour. The thermal analysis was performed (by employing a Universal V4.5A TA thermal Analyzer, and heating in air from room temperature to 700° C. (1292° F.) at a rate of 10° C./min). Results of Differential Scanning calorimetry (DSC) that determine peak temperatures of thermal effects are presented in FIG. 4. As seen from the data, for the stoichiometric aluminum dihydrogen phosphate of molar ratio Al:P=1:3, a strong endothermic effect was observed at about 250° C. (482° F.), and another endothermic effect was observed at about 522° C. (972° F.). A molar increase in aluminum content in aluminum phosphate based binder solutions from stoichiometric Al:P=1:3 to Al:P=1:2.7 and further to Al:P=1:2.4 resulted in disappearance of the endothermic effects. These results indicate that the above increase in aluminum content led to a reduction of the temperatures of completion of the heat induced transformations as compared to the stoichiometric aluminum dihydrogen phosphate of molar ratio Al:P=1:3. In other words, the compositions of the present invention are able to undergo a completion of heat induced transformations at temperatures well below in-service temperatures (i.e., typical temperatures of the Type 2 hot corrosion). This, in turn, means that the coatings of the present invention cured in the customary cure temperature regime of 600° F. to 1000° F. do not undergo any stress-induced transformations during service.

The aluminum content required to increase the molar ratio of Al:P can be supplied by any suitable aluminum containing raw material that is soluble in concentrated (~20-50 wt. %) acidic aqueous solution of aluminum dihydrogen phosphate, such as aluminum hydroxide, aluminum nitrate, etc.

Optionally, other additives known in the art can be incorporated into the aluminum phosphate-based binder. By way of example, the aluminum phosphate based binder can comprise pH adjusting compounds (such as magnesium oxide, magnesium carbonate, etc.), small amounts (e.g., ~1-2 wt. %) of boron oxide $B_2O_3$, and/or viscosity adjusting components. Alternatively, or in addition thereto, relatively small amounts of suitable organic solvents known in the art can also be added to improve properties, such as, for example, slurry sprayability, substrate wetting and film forming properties.

The slurry compositions of the present invention can be applied to a substrate by any number of conventional application techniques known in the art, such as by spraying, brushing, dipping, dip-spinning and the like. The applied layer is dried, and then cured. The binder solution polymerizes and solidifies under a drying and curing cycle to form a continuous matrix with acceptable mechanical strength, flexibility and chemical resistance. Pigments of either metallic particles, or metal oxide particles, or in combination, preferable aluminum oxides, $Al_2O_3$, are embedded or generally incorporated into the matrix of the basecoat, and in the case the employed top coat is not pigment—free, then metal oxide particles, preferably chromium (III) oxide $Cr_2O_3$ are embedded or otherwise generally incorporated into the matrix of the top coat.

Thus, in another aspect of the present invention the inorganic overlay coating are disclosed that are capable of withstanding thermal cycling at elevated temperatures typical of Type 2 hot corrosion attack and provide protection to a metal substrate against such Type 2 hot corrosion attack. The base coat of the inorganic coating of the present invention is generally applied to a thickness of between 0.5 to 3.0 mils, with a preferable thickness between 1.5 to 2.0 mils. Such a coating thickness can be built up in one layer (i.e., one application, drying, and curing cycle), or preferably in multiple layers with multiple cure cycles. The minimum thickness of the basecoat layer is determined by a need to provide a continuous layer covering a substrate, and the maximum thickness of the basecoat layer is generally determined by a targeted or specified thickness of the entire multilayer overlay system. Preferably, a coating thickness in excess of functional requirements for a particular application is avoided.

The top coating slurries of the present invention are then applied to the base coat to form the resultant multilayer coating systems of the present invention. In a preferred embodiment, the top coating is applied to a thickness of between 0.1 to 0.5 mils, with a more preferable thickness between 0.1 to 0.3 mils.

Typical cure temperatures of the coatings of the present invention are in the range of 600° F. to 1000° F. As evident to one skilled in the art, applicable curing operating regimes may include higher temperatures for a shorter time or lower temperatures for a longer time.

The inorganic coating of the present invention exhibit formation of dense, smooth and defect-free layers, as demonstrated in the Examples. The surface finish (smoothness) of the coatings $R_a$, as measured by Mitutoyo Surftest 301 (at a 5.1 mm traverse and 0.030" (0.76 mm) cutoff), is about 40 microinch (about 1 µm) or less.

Still further, a durable multilayer coating system for enhanced high-temperature oxidation & hot corrosion protection, formed onto a substrate from aqueous slurry compositions of the present invention. The multilayer coating comprises a metallic bond coat adjacent to a substrate, and an inorganic overlay coating of present invention on said metallic bond coat. A schematic of a durable multilayer coating system was described in FIG. 17. The metallic bond coat provides further protection on substrate against high-temperature oxidation attack and improves its durability. The metallic bond coat is selected from the group consisting of aluminide, chromium-rich coating, platinum aluminide, chromium aluminide, platinum-modified chromium, MCrAlY alloys (where M=Ni, Co, Fe or in combination). The metallic bond coat typically has a minimum 15%, by weight, of chromium, and/or a minimum 6%, by weight, of aluminum.

As will be shown and discussed below in the Examples, the inventors have carried out extensive experiments to test the coating systems of the present invention for their ability to withstand a thermal cycling in the corrosive environment at elevated temperatures typical of Type 2 hot corrosion attack, without spallation, as well as their ability to provide a stable protective barrier for a superalloy substrate against sulfur containing corrodents attack. The selected testing temperature was 1310° F. (710° C.), which is representative of the temperatures encountered for Type 2 hot corrosion attack, with a thermal cycle defined as 50 minutes dwell time in the hot zone at the testing temperature, immediately followed by 10 minutes dwell time at room temperature.

First, the Examples confirmed that the inorganic coating of the present invention was completely stable under thermal cycling at the testing temperature of 1310° F. (710° C.) in the absence of the corrosive sulfate deposit and effectively protected a superalloy substrate from thermal oxidation. In this regard, as shown in FIG. 5, the change in coating visual appearance was negligible, and both the basecoat and the top coat of the system remained substantially structurally intact after 100 thermal cycles. Also, no change in the sample's weight was observed.

Next, two different mixtures of corrosive sulfates were prepared, as shown in Table 1. Mixture A corresponded to a eutectic composition of a ternary sulfate system with a melting point of 1275° F. (690° C.). As a result, Mixture A was present in a liquid phase at the testing temperature of 1310° F. (710° C.). In comparison to Mixture A, Mixture B contained a higher amount of calcium sulfate, with 50 weight % excess amount of $CaSO_4$ over Mixture A's eutectic composition (i.e. at the test temperature, Mixture B was present in both a liquid phase and a solid state). Thus, Mixture A was expected to be more aggressive in a sulfur-based corrosion attack than Mixture B. Nonetheless, Mixture B is believed to potentially represent closer to real in-service conditions than Mixture A. However, testing for sulfate hot corrosion attack with such an aggressive Mixture A provides accelerated test conditions. Accordingly, the total number of thermal cycles in tests that were run with Mixture A were less than tests that were run with Mixture B.

TABLE 1

Composition of Corrosion Materials

| | Content, weight percent, % | |
| --- | --- | --- |
| Material | Mixture A | Mixture B |
| $Na_2SO_4$ | 53 | 26 |
| $MgSO_4$ | 37 | 18 |
| $CaSO_4$ | 10 | 55 |

In order to collect baseline data on the effects of corrosive attack on a superalloy, the testing was performed on bare Ni-based disc superalloy substrates (16 wt % Cr, such as RENE® 88). Mixture A was applied on sample surfaces of the Ni-based disc superalloy substrates in the amount of 2 mg per square centimeter of the coated sample surface area each 50 cycles, with a total of one hundred cycles run; and Mixture B was applied on sample surfaces of the Ni-based disc superalloy substrates also in the amount of 2 mg per square centimeter of the coated sample surface area, but reapplied each 100 cycles, with a total length of the test extended to five hundred cycles. It was observed that the bare substrates deteriorated dramatically in both tests as a result of sulfate attack. FIG. 6 presents weight loss of the bare substrate samples in the thermal cycling tests at 1310° F. (710° C.). As seen from the data, corrosion attack by both Mixture A and Mixture B led to a significant loss of the substrate material, and as expected, the weight loss was about two times higher after 100 cycles exposure to aggressive Mixture A (i.e., that was in a liquid state at the test temperature) than after 500 cycles with Mixture B. On the contrary, thermal cycling in the absence of the Mixture A and Mixture B sulfates that was performed at the same test temperature of 1310° F. (710° C.) (i) did not produce any noticeable weight change of the bare substrate (Table 2), and (ii) revealed a very minor growth of thermal scale on the surface of the superalloy.

TABLE 2

Bare substrate: thermal cycle test at 1310° F. (710° C.) without sulfate exposure

| Bare Substrate | Number of thermal cycles | Initial weight, gram | Weight after test, gram |
|---|---|---|---|
| Sample A | 50 | 6.0122 | 6.0129 |
| Sample B | 100 | 13.2402 | 13.2397 |

Thus, the weight loss of the substrate material was a result of the corrosive attack in the presence of sulfates and caused by consumption of the metal through growth of a scale of corrosion products on the surface, followed by spallation of this scale. As demonstrated by the SEM data of FIG. 7, the scale thickness is higher after 100 cycles in the case of Mixture A attack (FIG. 7(a)) as compared to its thickness after 500 cycles of exposure to Mixture B (FIG. 7(b)). The SEM data was consistent with the weight loss results shown in FIG. 6.

Next, the protective capabilities against sulfate attack of the chromate-free coating system of the present invention were compared with the Cr(VI)-containing systems known in the art, such as the system similar to the commercial SermaFlow® N3000. In this regard, the superalloy substrates coated with the coating system of the present invention were tested side-by-side with the substrates coated with a conventional coating system having a basecoat comprising chromate-phosphate binder filled with aluminum oxide $Al_2O_3$ particles, and a top coat comprising a chromate-phosphate binder filled with chromium (III) oxide $Cr_2O_3$ particles. Thus, the only difference between these two coating systems was the type of the binder matrix: Cr(VI)-free aluminum-phosphate based binder of the present invention vs. Cr(VI)-containing chromate-phosphate binder of the conventional coating systems. The test was performed with exposure to aggressive Mixture A sulfate deposit. The thermal cycling test was performed at 1310° F. (710° C.); the test results after one hundred cycles are presented in FIGS. 8(a) and 8(b). As seen, the Cr(VI)-free coating system of the present invention performed noticeably better (FIG. 8(a)). Whereas the commercially available chromate-phosphate based coating system deteriorated and partially spalled to expose a bare substrate (FIG. 8b), the coating system of the present invention maintained its integrity. These results will be described in more details in Comparative Example 2. The side-by-side comparison is evidence that the change in binder matrix from a Cr(VI)-containing chromate-phosphate binder to a Cr(VI)-free aluminum-phosphate based binder produced a noticeable and significant improvement in performance.

Last, the performance of a multilayer coating system of present invention comprising a metallic bond coat and an inorganic overlay coating, was compared with uncoated superalloy substrate and aluminide coating only. The multilayer coating of the present invention demonstrated no corrosion pit depth on aluminide bond coat and superalloy substrate. The outer inorganic coating acted as an excellent environmental barrier to molten sulfates while aluminide bond coat provided protection of superalloy against high-temperature oxidation attack. In comparison, the conventional aluminide coating only or uncoated superalloy demonstrated a maximum corrosion pit depth of about 60 micrometers after the same 500 hour hot corrosion test While the preferred embodiments of the inventive slurries formulations and coating systems have been set forth above along with representative examples, the following additional examples are intended to provide a basis for better evaluating the properties and functions of the slurries and coating systems of the present invention. The examples are merely illustrative, and they are not to be construed as limiting the scope of the present invention.

It should be understood that all the slurries of the present invention were characterized by their pH, viscosity, specific gravity and solids content. These parameters, together with $D_{50}$ and $D_{90}$ (defined as diameters of the $50^{th}$ percentile of a pigment particle size distribution and the $90^{th}$ percentile of a pigment particle size distribution, respectively) were measured to test stability and aging of the slurries. It was found that the slurries demonstrated acceptable stability and a shelf life of six months and longer.

Each of the coatings in the Examples and Comparative Examples below were applied onto substrates of Ni-based superalloy. The substrates were initially surface treated by grit-blasting with 100 mesh grit.

Example 1

A base coat slurry was prepared by mixing of 120 grams of alumina ($Al_2O_3$) powder into 153 milliliters (187 grams) of aluminum phosphate based binder with a molar ratio of Al:P equal to about 2.4. The pH of the basecoat slurry was measured to be about 1.4. The alumina pigment particle size was characterized as having a $D_{50}$ of about 2.5-3.0 microns and a $D_{90}$ of about 4.0-4.5 microns. The basecoat slurry was then sprayed onto the substrate, dried at 175° F. for 15 minutes and then cured at 650° F. for 30 minutes to form a cured layer of the basecoat. A top coat slurry was prepared by mixing of 24 grams of chromium (III) oxide $Cr_2O_3$ green pigment with 200 grams of aluminum phosphate based binder with a molar ratio of Al:P equal to about 1:2.4. The binder also contained 3.0 grams of $B_2O_3$. The pH of the top coat slurry was measured to be about 1.5. The pigment particle size in the topcoat slurry was characterized as having a $D_{50}$ of about 1.3-1.7 microns, and a $D_{90}$ of about 2.2-2.7 microns. The top coat slurry was sprayed onto the cured layer of the basecoat, dried at 175° F. for 15 minutes, and then cured at 650° F. for 30 minutes followed by curing at 1000° F. for 60 minutes to form a cured layer of the topcoat. The total thickness of the basecoat and top coat coating system was determined to be in the range from 2.1 to 2.3 mils.

The coated samples were subject to the thermal cycling test with exposure to sulfate Mixture A applied onto the coated sample surfaces in the amount of 2 mg per square centimeter of the coated sample surface area each 50 cycles.

TABLE 3

Thermal cycle test at 1310° F. (710° C.) with sulfate Mixture A exposure

| Coatings | # cycles | Initial W, g | Final W, g | ΔW, g | ΔW, mg/cm2 |
|---|---|---|---|---|---|
| Sample A | 50 | 6.8486 | 6.8504 | 0.0018 | 0.43 |
| Sample B | 50 | 4.7575 | 4.7582 | 0.0007 | 0.23 |
| Sample C | 100 | 5.0961 | 5.095 | −0.0011 | −0.35 |
| Sample D | 100 | 6.2305 | 6.2298 | −0.0007 | −0.18 |

TABLE 3-continued

Thermal cycle test at 1310° F. (710° C.) with sulfate Mixture A exposure

| Coatings | # cycles | Initial W, g | Final W, g | ΔW, g | ΔW, mg/cm2 |
|---|---|---|---|---|---|
| Bare substrate | 50 | 5.2185 | 5.1857 | −0.0328 | −10.18 |
| Bare substrate | 100 | 7.113 | 7.0579 | −0.0551 | −15.52 |
| Bare substrate | 100 | 5.616 | 5.5547 | −0.0613 | −18.46 |

Four samples A through D were used. Samples A and B were tested for 50 cycles, respectively, and Samples C and D were tested for 100 cycles, respectively. The weight change was measured after each 50 cycles, with the coating surface cleaned from the sulfate residue with water prior to taking weight measurements. The data are presented in Table 3, as milligrams of a weight change ΔW per square centimeter of the sample surface area.

As seen from the data, the weight change of the coated samples A-D was insignificant, especially as compared to the very high weight loss of the bare substrates. The comparison is also shown in the data in the graphical form in FIG. 9.

Example 2

The samples of the inorganic overlay coating system of Example 1 were subject to a thermal cycle test at 1310° F. (710° C.) for 100 cycles. One group of the samples was tested without application of the corrosive sulfate mixture, and another group was tested with application of the aggressive sulfate Mixture A. After testing, the samples were cross-sectioned and examined by SEM analysis. As seen from the SEM results (FIGS. 10(a) and 10(b)), both groups of the samples preserved the coating layers—even the top coat was not lost as a result of the sulfate attack. Thus, despite exposing the coated samples to aggressive testing conditions designed to be more harsh than real in-service conditions, only minor changes of the substrate in some areas on the boundary with the coating layer were detected. The SEM results confirmed that the Cr(VI)-free multilayer coating system of the present invention serves as an efficient barrier for corrosive attack by melted sulfates.

Example 3

Samples E and F were prepared and coated with the inorganic overlay coating system of the present invention as described in the Example 1, to a total thickness of the basecoat and top coat coating system in a range from 1.6 to 1.8 mils. The coated samples were subject to the thermal cycling test with less aggressive sulfate Mixture B. Mixture B was applied on sample surfaces in the amount of 2 mg per square centimeter of the coated sample surface area each 100 cycles. The total test length was extended to 500 cycles. The samples were cleaned with water and weighed after 100 cycles and at the end of test (i.e. after 500 cycles). For the baseline data, bare substrates were also included in this test, with the weight change data collected after 200 and 500 cycles.

As observed by the visual appearance (FIGS. 11(a), 11(b) and 11(c)), the present invention's coating system stayed on the substrate throughout the whole test, and even the top coat layer was preserved after 500 cycles of testing (see Sample F in FIG. 11(c)).

As seen from the weight change data presented in Table 4, the coating systems of the present invention was also efficient in protecting the substrate from corrosive attack by the mixture of melted and solid sulfates: the coated samples demonstrated a minor increase in weight, most probably caused by a thermal oxidation process, whereas the bare substrates underwent a significant weight loss caused by sulfate corrosion. As was discussed earlier, the substrate weight loss in this longer test with less aggressive sulfate Mixture B was lower than that observed with the more aggressive Mixture A (see FIGS. 6 and 7), but still demonstrated a detrimental loss of base metal.

TABLE 4

Thermal cycle test at 1310° F. (710° C.) with sulfate Mixture B exposure

| Coatings | # cycles | Initial W, g | Final W, g | ΔW, g | ΔW, mg/cm2 |
|---|---|---|---|---|---|
| Sample E | 100 | 7.4466 | 7.4490 | 0.0024 | 0.537 |
| Sample F | 500 | 8.1059 | 8.1100 | 0.0041 | 0.835 |
| Bare substrate | 200 | 7.0026 | 6.9697 | 0.0329 | −7.616 |
| Bare substrate | 500 | 6.0786 | 6.0559 | 0.0227 | −6.219 |

After testing, Sample E and Sample F were cross-sectioned and examined by SEM/EDS analysis. As seen from the SEM results (FIGS. 12(a) and 12(b)), both samples preserved the coating layers—the basecoat was intact, and even the top coat was not lost after 500 cycles of the sulfate corrosive attack. EDS analysis data confirmed that the observed small gain in the samples weight after the test was mostly a result of the substrate minor oxidation in some local areas on the boundary with the coating layer, with no noticeable sulfidation attack. Thus, in these less aggressive, but five times more prolonged testing conditions, Applicants validated that the Cr(VI)-free coating system of the present invention serves as an efficient barrier for corrosive attack by a mixture of molten and solid sulfates.

Example 4

The substrate was made of a single-crystal nickel-based superalloy, CMSX-4®, which is a trademark of CANNON-MUSKEGON CORPORATION. CMSX-4 has a nominal composition of, by weight, about 9% Co, 6.5% Cr, 5.6% Al, 6% W, 6.5% Ta, 3% Re, 1% Ti, 0.6% Mo, 0.1% Hf, and balance nickel. A multilayer coating system of present inventions, comprising aluminide bond coat and an inorganic coating, was applied onto CMSX-4 substrate for hot corrosion performance test.

First, an aluminide coating was applied onto CMSX-4 substrate by conventional vapor phase aluminizing process. The resultant aluminide coating thickness is about 60 micrometers.

Second, a base coat slurry was prepared by mixing of 120 grams of alumina ($Al_2O_3$) powder into 153 milliliters (187 grams) of aluminum phosphate-based binder with a molar ratio of Al:P equal to about 1:2.4. The pH of the basecoat slurry was measured to be about 1.4. The alumina pigment particle size was characterized as having a $D_{50}$ of about 2.5-3.0 microns and a $D_{90}$ of about 4.0-4.5 microns. The basecoat slurry was then sprayed onto the substrate, dried at 175° F. for 15 minutes and then cured at 650° F. for 30 minutes to form a cured layer of the basecoat. The resultant basecoat thickness is about 50 micrometers Third, a topcoat slurry was prepared by mixing of 24 grams of chromium (III) oxide $Cr_2O_3$ green pigment with 200 grams of aluminum phosphate based binder with a molar ratio of Al:P equal to about 1:2.4. The binder also contained 3.0 grams of $B_2O_3$. The pH of the topcoat slurry was measured to be about 1.5. The pigment particle size in the topcoat slurry was characterized as having a $D_{50}$ of about 1.3-1.7 microns, and a $D_{90}$ of about 2.2-2.7 microns. The top coat slurry was sprayed onto the cured layer of the basecoat, dried at 175° F. for 15 minutes, and then cured at 650° F. for 30 minutes followed by curing at 1000° F. for 60 minutes to form a cured layer of the topcoat. The resultant topcoat thickness is about 5 micrometers.

The coated sample were subject to hot corrosion testing. The hot corrosion test was performed at a static exposure temperature of 710° C. in air for a total exposure time up to 500 hours. The test samples were evaluated for maximum corrosion pit depth after 200 hour and 500 hour lab test. About 2 mg/cm² of a synthetic sulfate mixture A, as listed in table, was applied onto the sample surface prior to the test and was replenished every 100 hours.

Figure 19B:
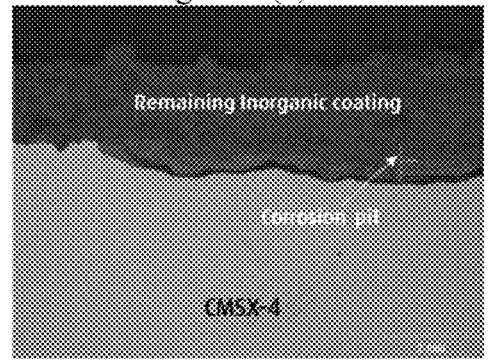
FIG. 19(b) shows a cross-sectional image of about 20 micrometer corrosion pit depth of inorganic overlay coating (b) of present invention after 500 h corrosion test with mixture A in comparison to FIG. 19(c) showing about 60 micrometer corrosion pit depth of conventional aluminide coating (c) and Figure (d) showing about 60 micrometer corrosion pit depth for uncoated CMSX-4 (d).
Figure 19C:
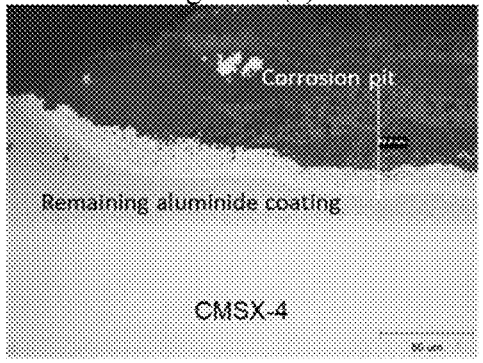
Figure 19D:
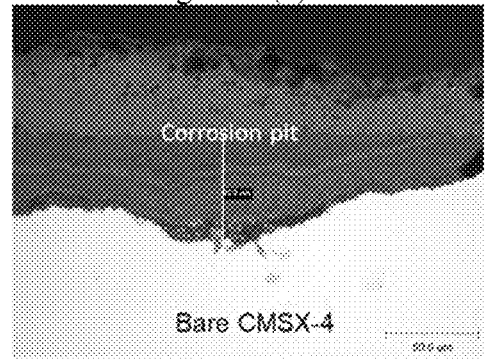

As can be seen from results in FIGS. 18 and 19, after 200 h test, both inorganic overlay coating and multilayer coating of present invention demonstrated no corrosion attack on substrate in comparison to about 50 micrometer corrosion pit depth on both base CMSX-4 substrate and conventional aluminide coating. After 500 h test, the corrosion pit depth on both bare CMSX-4 and conventional aluminide coating increased to about 60 micrometer. Some corrosion attack up to about 20 micrometer corrosion pit depth was observed on sample with inorganic overlay coating. The multilayer coating with metallic bond coat and inorganic coating performed the best and demonstrated no corrosion pit depth on aluminide bond coat and superalloy substrate. The outer inorganic coating acted as an excellent environmental barrier to molten sulfates while presence of aluminide bond coat between substrate and inorganic overlay coating provided further enhanced protection of superalloy against high-temperature oxidation attack.

Comparative Example 1

To compare functional performance in hot corrosion protection of the Cr(VI)-free coating system of the present invention with another commercially available Cr(VI)-containing coating system, coated samples G and H were prepared in accordance with the teachings of U.S. Pat. No. 7,314,674 to Hazel et. al. Sample G and Sample H were prepared as follows. The basecoat slurry of the Cr(VI)-containing coating system comprised a chromate-phosphate based binder filled with metal alloy powder with the representative formula MCrAlY (where M is Ni or Co). The basecoat slurry was sprayed on the substrates, dried at 175° F. for 15 minutes and then cured at 650° F. for 30 minutes to form a cured basecoat layer. Then, the cured basecoat layer was further coated with a top coat slurry comprising a chromate-phosphate based binder filled with particles of metal oxide pigments. SermaSeal™ 570A slurry commercially available from Praxair Surface Technologies, Inc. (Indianapolis, IN) was employed for a top coat slurry. The top coat slurry was sprayed on the cured layer of the basecoat, dried at 175° F. for 15 minutes and cured at 650° F. for 30 minutes. The total thickness of the applied Cr(VI)-containing coating system on Samples G and H was in the range of 1.6-1.8 mils, i.e. the same as for Cr(VI)-free coating system Samples E and F in Example 3. The coated samples G and H were subject to the thermal cycling test with exposure to less aggressive sulfate Mixture B, in accordance to the test protocol as in Example 3.

According to the results, in contrast to the Cr(VI)-free coating system of the present invention that preserved its top coat through 500 cycles of testing, the Cr(VI)-containing coating system samples demonstrated that the top coat was mostly lost only after 100 cycles and completely absent after 500 cycles (see FIG. 13(b) and FIG. 13(c), respectively). The weight gain of 1.478 mg per square centimeter of the coated sample surface area was measured for Sample G that was exposed to 100 cycles and of 3.417 mg per square centimeter of the coated sample surface area for Sample H after 500 cycles, i.e. 3-4 times higher as compared with the corresponding weight gain for the Cr(VI)-free coating system of the present invention. Also, EDS analysis indicated that a sulfidation attack was more significant in the case of the Cr(VI)-containing coating: in most analyzed spots on the substrate—coating boundary, up to 6.5 atomic percent of sulfur had been detected.

The data obtained in this Comparative Example 1 in comparison with the data of the Example 3 are presented in FIG. 14. Overall, although both systems preserved the substrate from corrosive sulfate attack, the coating system of the present invention performed significantly better. Thus, the inventive coating system provides not only a benefit of being environmentally compliant and free of hexavalent chromium presence, but also demonstrates better functional performance than a commercial Cr(VI)-containing coating system generally accepted as the benchmark in resistance to hot corrosion performance prior to the emergence of the present invention.

Comparative Example 2

In this test, two coating systems that are commercially available were prepared to evaluate their ability to impart protective properties against attack by the aggressive molten sulfate Mixture A. The thermal cycling test was performed at 1310° F. (710° C.) according to the protocol described in Example 1, but for a longer duration of one hundred fifty cycles. For this test, the coated samples I through K were prepared as follows. Sample I was coated with a commercial Cr(VI)-containing system, known as SermaFlow® N3000 and available from Praxair Surface Technologies, Inc. (Indianapolis, IN), having a basecoat comprising chromate-phosphate binder filled with aluminum oxide $Al_2O_3$ particles, and a top coat comprising a chromate-phosphate binder filled with chromium (III) oxide $Cr_2O_3$ particles. Sample J of another Cr(VI)-containing coating system was prepared as described in the Comparative Example 1 (i.e. utilizing a basecoat comprising a chromate-phosphate based binder filled with metal alloy powder with the representative formula MCrAlY, and a top coat of SermaSeal™ 570A). Sample K was coated with the coating system of the present invention, as described in Example 1. A bare substrate sample was also included in this test to provide a baseline. As seen from FIG. 15 that presents results of this side-by-side comparisons, the Cr(VI)-free coating system of the present invention with aluminum-phosphate based binder matrix significantly outperformed commercially available systems and produced drastic improvement in protection of the superalloy substrate against hot corrosion by molten sulfate attack.

Comparative Example 3

In this test, a Cr(VI)-free coating system with a Lithium-doped Potassium silicate binder based basecoat as described in U.S. Pat. No. 9,394,448 to Belov et. al was prepared to evaluate its performance against attack by the aggressive molten sulfate Mixture A. A base coat slurry was prepared by mixing of 230 grams of alumina ($Al_2O_3$) powder into 307 grams Lithium-doped Potassium silicate based binder solution. The alumina pigment particle size was the same as in Example 1 (i.e., $D_{50}$ of about 2.5-3.0 microns and a $D_{90}$ of about 4.0-4.5 microns). The pH of the basecoat slurry was measured to be about 10.9. The basecoat slurry was then sprayed onto the substrate, dried at 175° F. for 15 minutes and then cured at 650° F. for 30 minutes to form a cured layer of the basecoat. A top coat slurry as employed in Example 1 was used (i.e., mixing of chromium (III) oxide $Cr_2O_3$ into aluminum phosphate-based binder with a molar ratio of Al:P equal to about 1:2.4). The top coat slurry was sprayed onto the cured layer of the basecoat, dried at 175° F. for 15 minutes, and then cured at 650° F. for 30 minutes followed by curing at 1000° F. for 60 minutes to form a cured layer of the topcoat. The total thickness of the basecoat and top coat coating system was determined to be in the range from 2.5 to 2.7 mils.

Two coated samples were then subjected to the thermal cycling test with exposure to sulfate Mixture A. The same testing protocol for the thermal cycling as in Example 1 was employed. The results are presented in FIG. 16, which clearly show a large portion of the coating was destroyed and spalled after only 50 cycles. These results demonstrated that the Cr(VI)-free coating system with Lithium-doped Potassium silicate-based basecoat binder as described in U.S. Pat. No. 9,394,448 to Belov et. al was not suitable for service under sulfate corrosion attack.

Comparative Example 4

A conventional aluminide coating was applied by conventional vapor phase aluminizing process onto a CMSX-4 substrate. The resultant aluminide coating thickness is about 60 micrometers. This aluminide only coated sample and uncoated CMSX-4 samples were included in the hot corrosion testing described in Example 4. The hot corrosion test was performed at a static exposure temperature of 710° C. in air for a total exposure time of 500 hours. About 2 mg/cm² of a synthetic sulfate mixture A, as listed in table, was applied onto the sample surface prior to the test and was replenished every 100 hours.

As seen in FIGS. 18 and 19(*a*), after 500 hours hot corrosion test, both aluminide-only coated sample and uncoated superalloy demonstrated corrosion pit depth of about 60 micrometers, and led to significant materials loss and performance reduction.

The invention claimed is:

1. An aqueous slurry composition for the production of a multilayer coating system for hot corrosion protection of a substrate comprising:
   a basecoat slurry, comprising:
   a first binder comprising an aluminum phosphate based aqueous solution having a molar ratio of Al:P higher than about 1:3, the first binder characterized by an absence of hexavalent chromium; and
   metallic particles or metal oxide particles or a combination thereof incorporated into the first binder;
   a topcoat slurry, comprising:
   a second binder comprising an aluminum phosphate based aqueous solution having a molar ratio of Al:P higher than about 1:3, the second binder characterized by an absence of hexavalent chromium.

2. The aqueous slurry composition of claim 1, wherein the metal oxide particles are selected from the group consisting of aluminum oxide, titanium oxide, zirconium oxide, and chromium oxide.

3. The aqueous slurry composition of claim 1, wherein the metallic particles are selected from the group consisting of MCr, MAl, MCrAl, or MCrAlY alloys (where M=Ni, Co, Fe or a combination thereof).

4. The aqueous slurry composition of claim 1, wherein the metal oxide particles of the basecoat slurry comprise aluminum oxide (Al2O3) particles incorporated into said first binder, and the topcoat slurry comprises trivalent chromium oxide (Cr2O3) particles incorporated into said second binder.

5. The aqueous slurry composition of claim 1, wherein the molar ratio of Al:P in the second binder of the topcoat slurry ranges from about 1:2.1 to about 1:2.9, and the molar ratio of Al:P in the first binder of the basecoat slurry ranges from about 1:2.1 to about 1:2.9.

6. The aqueous slurry composition of claim 1, wherein the molar ratio of Al:P in the second binder of the topcoat slurry ranges from about 1:2.4 to about 1:2.7 and the molar ratio of Al:P in the first binder of the basecoat slurry ranges from about 1:2.4 to about 1:2.7.

7. The aqueous slurry composition of claim 1, wherein either metallic particles or metal oxide particles, or both in combination in basecoat slurry have a particle size distribution characterized in that a 50th percentile of the particle size distribution has a diameter of between about 1 to 10 microns.

8. The aqueous slurry composition of claim 1, wherein the topcoat slurry further comprises trivalent chromium oxide (Cr2O3) particles with a particle size distribution characterized in that a 50th percentile of the particle size distribution has a diameter of between about 1.0 and 2.0 microns and the 90th percentile of the particle size distribution has a diameter of less than or equal to about 3.0 microns.

9. An inorganic overlay coating system for hot corrosion protection of a substrate, comprising:
   a basecoat comprising a first hexavalent chromium-free, aluminum-phosphate based binder having a molar ratio of Al:P higher than about 1:3, and either metallic particles or metal oxide particles, or both in combination embedded into the first aluminum-phosphate binder, and
   a topcoat comprising a second hexavalent chromium-free, aluminum-phosphate based binder having a molar ratio of Al:P higher than about 1:3.

10. The inorganic overlay coating system of claim 9, wherein the molar ratio of Al:P in the first hexavalent chromium-free, aluminum-phosphate based binder ranges from about 1:2.1 to about 1:2.9 and the molar ratio of Al:P in the second hexavalent chromium-free, aluminum-phosphate based binder ranges from about 1:2.1 to about 1:2.9.

11. The inorganic overlay coating system of claim 9, wherein the molar ratio of Al:P in the first hexavalent chromium-free, aluminum-phosphate based binder ranges from about 1:2.4 to about 1:2.7 and the molar ratio of Al:P in the second hexavalent chromium-free, aluminum-phosphate based binder ranges from about 1:2.4 to about 1:2.7.

12. The inorganic overlay coating system of claim 9, wherein the metal oxide particles are selected from the group consisting of aluminum oxide, titanium oxide, zirconium oxide, and chromium oxides.

13. The inorganic overlay coating system of claim 9, wherein the metallic particles are selected from the group consisting of MCr, MAl, MCrAl, or MCrAlY alloys (where M=Ni, Co, Fe or a combination thereof).

14. The inorganic overlay coating system of claim 9, wherein the metal oxide particles or metallic particles or both in combination have a particle size distribution characterized in that a 50th percentile of the particle size distribution has a diameter of between about 1 to 10 microns.

15. The inorganic overlay coating system of claim 9, wherein the metal oxide particles are embedded in the first ceramic matrix of the basecoat, said metal oxide particles comprising aluminum oxide Al2O3, and further wherein trivalent chromium oxide Cr2O3 particles are embedded in the second ceramic matrix of the topcoat.

16. The inorganic overlay coating system of claim 9, wherein the topcoat comprises chromium oxide (Cr2O3) particles having a particle size distribution characterized in that a 50th percentile of the particle size distribution has a diameter of between about 1.0 and 2.0 microns and the 90th percentile of the particle size distribution has a diameter of less than or equal to about 3.0 microns.

17. A durable multilayer coating system for enhanced high-temperature oxidation and hot corrosion protection of a substrate, comprising:
   a substrate;
   a metallic bond coat on the said substrate;
   an inorganic coating on the said metallic bond coat, said inorganic coating comprising:
      a basecoat comprising a first hexavalent chromium-free, aluminum-phosphate based binder having a molar ratio of Al:P higher than about 1:3, and either metallic particles or metal oxide particles, or both in combination embedded into the first aluminum-phosphate binder, and
      a topcoat comprising a second hexavalent chromium-free, aluminum-phosphate based binder having a molar ratio of Al:P higher than about 1:3.

18. The multilayer coating system of claim 17, wherein the molar ratio of Al:P in the first hexavalent chromium-free, aluminum-phosphate based binder ranges from about 1:2.1 to about 1:2.9 and the molar ratio of Al:P in the second hexavalent chromium-free, aluminum-phosphate based binder ranges from about 1:2.1 to about 1:2.9.

19. The multilayer coating system of claim 17, wherein the molar ratio of Al:P in the first hexavalent chromium-free, aluminum-phosphate based binder ranges from about 1:2.4 to about 1:2.7 and the molar ratio of Al:P in the second hexavalent chromium-free, aluminum-phosphate based binder ranges from about 1:2.4 to about 1:2.7.

20. The said basecoat of inorganic coating of claim 17, wherein the metal oxide particles are selected from the group consisting of aluminum oxide, titanium oxide, zirconium oxide, and chromium oxides.

21. The said basecoat of inorganic coating of claim 17, wherein the metallic particles are selected from the group of MCr, MAl, MCrAl, or MCrAlY alloys (where M=Ni, Co, Fe or a combination thereof).

22. The said basecoat of inorganic coating of claim 17, wherein the metal oxide particles or metallic particles or both in combination have a particle size distribution characterized in that a 50th percentile of the particle size distribution has a diameter of between about 1 to 10 microns.

23. The multilayer coating system of claim 17, wherein the metal oxide particles are embedded in the first ceramic matrix of the basecoat, said metal oxide particles comprising aluminum oxide Al2O3, and further wherein trivalent chromium oxide Cr2O3 particles are embedded in the second ceramic matrix of the topcoat.

24. The said topcoat of inorganic coating of claim 17, wherein chromium oxide (Cr2O3) particles have a particle size distribution characterized in that a 50th percentile of the particle size distribution has a diameter of between about 1.0 and 2.0 microns and the 90th percentile of the particle size distribution has a diameter of less than or equal to about 3.0 microns.

25. The said metallic bond coat of claim 17, wherein the metallic bond coat is selected from the group consisting of aluminide, chromium-rich coating, platinum aluminide, chromium aluminide, platinum-modified chrome, MCrAlY alloys (where M=Ni, Co, Fe or a combination thereof).

* * * * *